(12) United States Patent
Astorino

(10) Patent No.: US 9,857,237 B2
(45) Date of Patent: Jan. 2, 2018

(54) INDIVIDUALIZED WINE BOTTLE TEMPERATURE INDICATOR

(71) Applicant: Louis D. Astorino, Pittsburgh, PA (US)

(72) Inventor: Louis D. Astorino, Pittsburgh, PA (US)

( * ) Notice: Subject to any disclaimer, the term of this patent is extended or adjusted under 35 U.S.C. 154(b) by 409 days.

(21) Appl. No.: 14/577,497

(22) Filed: Dec. 19, 2014

(65) Prior Publication Data

US 2016/0178455 A1   Jun. 23, 2016

(51) Int. Cl.
*G01K 11/16* (2006.01)

(52) U.S. Cl.
CPC ........ *G01K 11/165* (2013.01); *G01K 2207/08* (2013.01)

(58) Field of Classification Search
CPC .............................. G01K 11/12; G01K 11/165
See application file for complete search history.

(56) References Cited

U.S. PATENT DOCUMENTS

| | | | | |
|---|---|---|---|---|
| 4,538,926 A * | 9/1985 | Chretien | ................ | G01K 1/143 374/150 |
| 5,720,555 A * | 2/1998 | Elele | ...................... | G01K 11/16 116/216 |
| 5,738,442 A * | 4/1998 | Paron | ................... | G01K 11/165 374/150 |
| 6,264,049 B1 * | 7/2001 | Shteynberg | ............... | A61J 9/02 215/11.1 |
| 6,544,614 B1 * | 4/2003 | Huffer | ....................... | A61J 9/02 116/200 |
| 2002/0021741 A1 * | 2/2002 | Faries, Jr. | .............. | G01K 11/12 374/141 |
| 2002/0030030 A1 * | 3/2002 | Rees | ......................... | A61J 9/02 215/11.2 |
| 2005/0104035 A1 * | 5/2005 | Eaddy | .................... | C09K 19/00 252/299.01 |
| 2006/0182165 A1 * | 8/2006 | Tapelt-Glaser | ...... | G01K 11/165 374/162 |
| 2008/0140432 A1 * | 6/2008 | Fenn | .................... | G06Q 30/018 705/317 |
| 2008/0142529 A1 * | 6/2008 | LaGuardia | ......... | B65D 81/3874 220/592.2 |
| 2009/0183669 A1 * | 7/2009 | Scott | ...................... | G01K 11/16 116/216 |

* cited by examiner

*Primary Examiner* — Lisa Caputo
*Assistant Examiner* — Philip Cotey
(74) *Attorney, Agent, or Firm* — Gary P. Topolosky

(57) ABSTRACT

A wine thermometer for adhering to a wine bottle indicates the temperature of a particular wine product in that bottle. The thermometer comprises an adhesive backed flexible plastic substrate having three to five predetermined color sections mounted on the flexible substrate with a first color section indicating when a preferred serving temperature for the particular wine product inside has been reached, a second color section indicating when the temperature for the particular wine product inside is higher than preferred and a third color section indicating when the temperature for the particular wine product inside is lower than preferred.

20 Claims, 7 Drawing Sheets

INDIVIDUALIZED WINE BOTTLE TEMPERATURE INDICATOR

BACKGROUND OF THE INVENTION

This invention pertains to thermometers and, particularly, to a thermometer for measuring wine temperature in a bottle prior to serving. Heretofore, wine temperature has been measured prior to serving by opening the bottle and inserting a thermometer into the bottle. There was also a universal wine temperature label that covered the full spectrum of various wine products. Preferably, it would be advantageous to provide a means for measuring temperature of a specific wine before opening the bottle. Something less complicated, less confusing than studying a full range of serving temperatures and color coordination for a collection of wine products that would be 10-20% relevant. The temperature indication means of this invention can stand alone, be incorporated into an existing label/brand and/or made for repeated reuse.

Wine connoisseurs know that the temperature of wine can make a considerable difference in taste and enjoyment. Vineyards are responding by listing the correct temperature on most new labels. Serving wine too cold reduces its aroma and flavor. In some instances, over chilling may highlight a wine's bitterness. Serving wine too warm can make its flavor unpleasantly dull and flat. It may also make the wine seem harshly alcoholic.

One way to measure wine temperature is to withdraw the cork and immerse a conventional thermometer into the wine bottle. If it is determined that the wine is not at the correct temperature, it is too late to compensate by heating or cooling an already opened bottle.

U.S. Pat. No. 3,864,976 discloses a liquid crystal strip or band thermometer that may be attached to a bottle with an elastomeric strip. U.S. Pat. No. 5,304,003 discloses a liquid crystal strip thermometer that adhesively attaches to an aquarium for viewing through the glass and water.

U.S. Pat. No. 4,538,926 is specific to wine bottle temperatures. It discloses a single liquid crystal composition that changes color with temperature and a comparison band with which the color can be compared. A symbol in the comparison band indicates the exact temperature for serving the wine in the bottle to which the device is attached. But it was a first variation of universal temperature indication— across a range of various wine products.

Finally, there is U.S. Pat. No. 5,738,442 in which a single strip of adhesive temperature indication affixes to a wine bottle (regardless of its contents-type) for showing the varying ranges at which different wine products would be better/best served. That temperature strip includes both primary temperature scales, Fahrenheit and Centigrade, as well as some color indication when a preferred temperature for a given wine product (within the bottle) has been achieved.

SUMMARY OF THE INVENTION

The customized wine thermometer indicator for this invention is designed for measuring and indicating the temperature of a particular bottle of wine for the consumer or server. Using liquid crystal technology, the wine thermometer comprises a thin patch adhesively attachable to the bottle exterior. With adhesive attachment, the temperature of the bottle and the wine within can be quickly and accurately determined without breaching the bottle integrity and/or damaging the bottle's contents. Thus, this new wine thermometer can measure the preferred temperature for a given type of wine and for temperatures both lower and higher than that specific, preferred temperature.

By immersing the bottle in warm or cool water or placing in the refrigerator, the server or consumer can obtain the exact temperature recommended by the vintner. This enables the average wine consumer to enjoy wine at its optimum temperature without expensive refrigerated storage or wine temperature control equipment.

The entire spectrum of wine temperatures for various products will range from a low of about 40° F. (for sparkling wines) to a high of about 66° F. (for complex red wines). That full spectrum will cover the ideal consumption temperature ranges for all wines, including the various red and white wine products in between the aforementioned temperature "extremes".

The wine thermometer of this invention can be manufactured by printing the necessary information on an adhesive backed flexible plastic substrate. That adhesive may be semi-permanent and similar to the label adhesive. Alternately, an adhesive may be chosen that allows the wine thermometer indicator to be repeatedly removed and applied sequentially to other bottles. The liquid crystal material is formed or coated on a flexible plastic substrate.

In the prior art temperature indicator of U.S. Pat. No. 5,738,442, there were several ways to determine the appropriate temperature of a particular wine style. First, there was a broad classification with reference to the following categories: sparkling wines, white wines, complex white wines, red wines and complex red wines, also known as fortified wines. For the preceding category ranges, the server/consumer could refer to a comprehensive listing of wine styles to find the exact recommended temperature range, as some wines may vary from the category to which they first thought to belong. A comprehensive list of wine styles may be found on a card accompanying the packaging for the wine thermometer and kept for future reference by the server or consumer.

Then, if the server or consumer knows the recommended temperature, which is sometimes printed on the wine bottle label, the temperature of wine in that bottle can be directly compared to the recommended temperature.

BRIEF DESCRIPTION OF THE DRAWINGS

Further features, objectives and advantages of the present invention, as compared to the prior art, will become clearer with the detailed description of preferred embodiments made with reference to the accompanying drawings in which.

DESCRIPTION OF PREFERRED EMBODIMENTS

Figure 1:
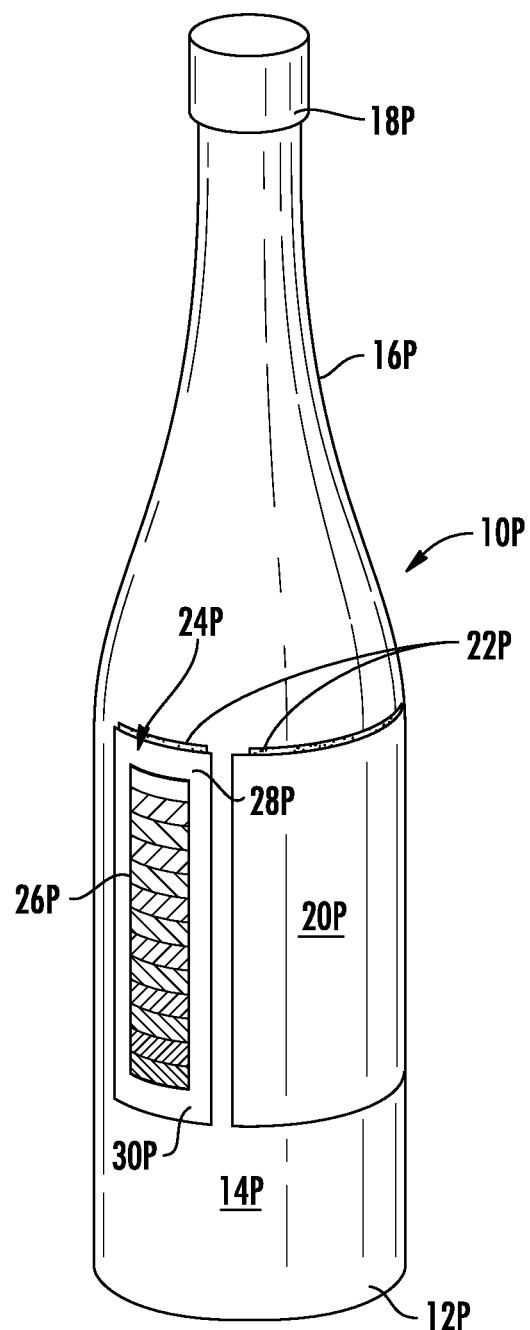
FIG. 1 is a perspective view of the prior art wine temperature bottle from U.S. Pat. No. 5,738,442.
Figure 2:
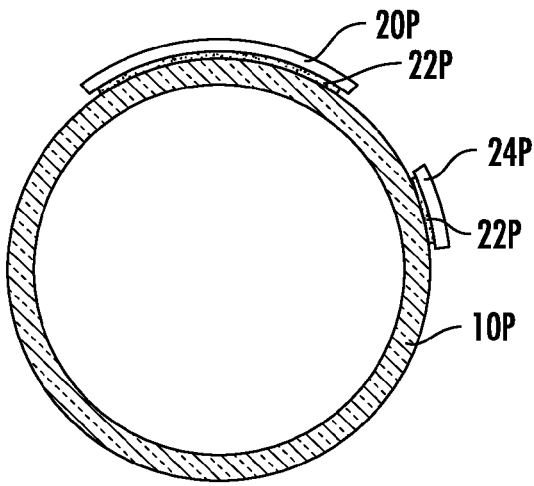
FIG. 2 is a cross sectional view of the prior art label adhered to the wine bottle of FIG. 1.
Figure 3:
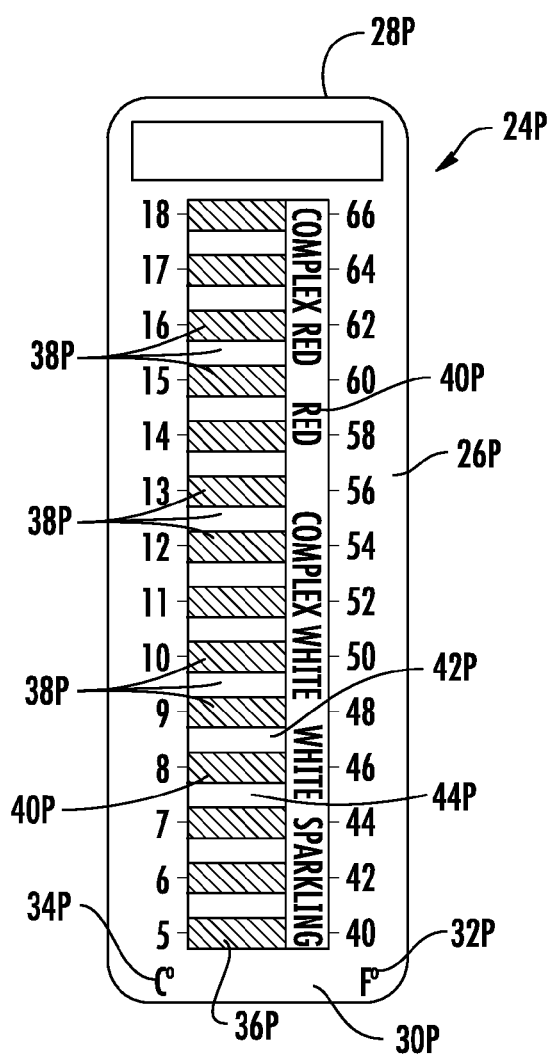
FIG. 3 is a front view of the prior art universal temperature label from FIGS. 1 and 2.

In FIGS. 1 through 3, the prior art thermometer for U.S. Pat. No. 5,738,442 is shown in detail. For its various elemental components, they are indicated with a P suffix after the number. Particularly therein, the main body of a typical, standard-shaped wine bottle 10P has a base 12P, label panel region 14P, neck 16P and mouth or top end 18P. A label 20P is affixed to the lower center of that wine bottle 10P, between the base 12P and neck 16P, over the label panel region 14P. Label 20P affixes to the label panel region 14P with one or more sections of adhesive 22P as best seen, cross-sectionally, at FIG. 2.

Referring now to FIG. 3, the prior art universal thermometer 24P is shown as a flexible plastic strip 26P having a top end 28P and bottom end 30P. Strip 26P has attached thereto by a printing or similar process two vertical scales 32P and 34P of temperature in Fahrenheit and Centigrade, respectively, over the full range of temperatures at which various wines are appropriately served.

Lying between scales 32P and 34P, there is a vertical panel 36P comprising a plurality of liquid crystal temperature indicator bands 38P along with five quick reference categories of wine products 40P printed adjacent the temperature indicator bands 38P.

The vertical panel 36P of temperature indicator bands 38P changes vertically along the panel with individual color bands (13 total, separated by non-color dividers) varying when the liquid crystal transition temperature for that particular indicator band has been reached. In one embodiment, an indicator band corresponding to a first temperature changes to green. The adjacent indicators may optionally change with the next adjacent indicator bands, the one above band becoming tan and one below becoming blue.

In FIG. 2 a prior art wine thermometer 24P is shown attached to its bottle 10P by adhesive 22P which may be permanent or just temporarily applied so that thermometer 24P may be recycled to succeeding bottles. With that universal wine thermometer tightly applied to a bottle, the temperature of its contents can be read without opening the bottle.

To best illustrate the complexity of the prior art, UNIVERSAL labeling system, consider one of their stated examples. For a thermometer 24P applied to a bottle 10P of simple white wine, a green indicator band 40P would appear in the range of 44 to 48° F., preferably 46° F. A tan indicator band 42P would appear above and a blue band 44P below the green band at the preferred 46° F. temperature. If the wine inside that bottle lies one or two degrees below 40° F., the lowest indicator band (at the 40° F. mark) will indicate tan. Similarly, if the uppermost indicator band is blue, the wine is one or two degrees above 66° F. And if the label panel region 14P remains black, the wine temperature is beyond the scales of that prior art universal thermometer.

Figure 4:
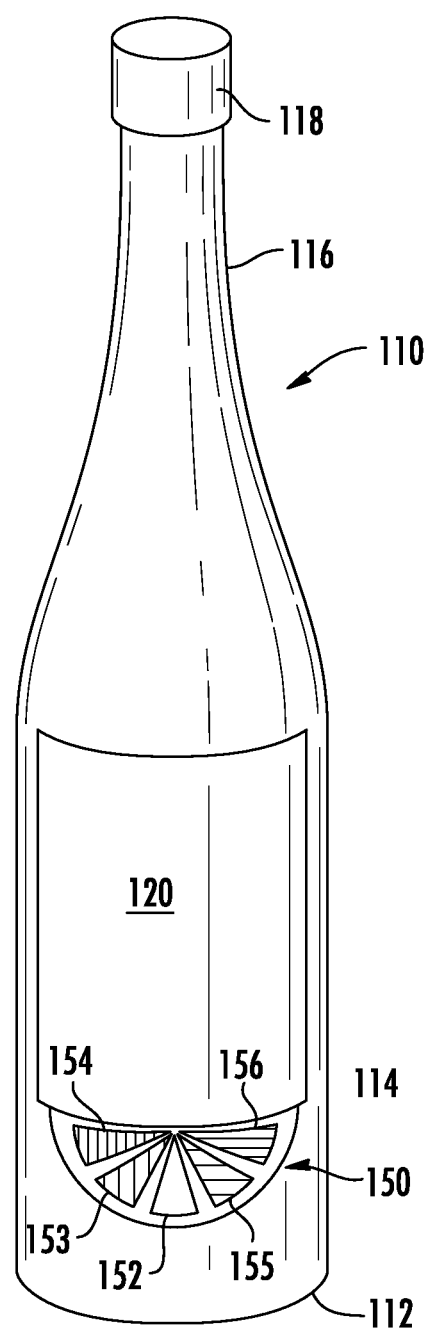
FIG. 4 is a perspective view of the customized wine bottle temperature indicator according to one preferred embodiment of the present invention.
Figure 5:
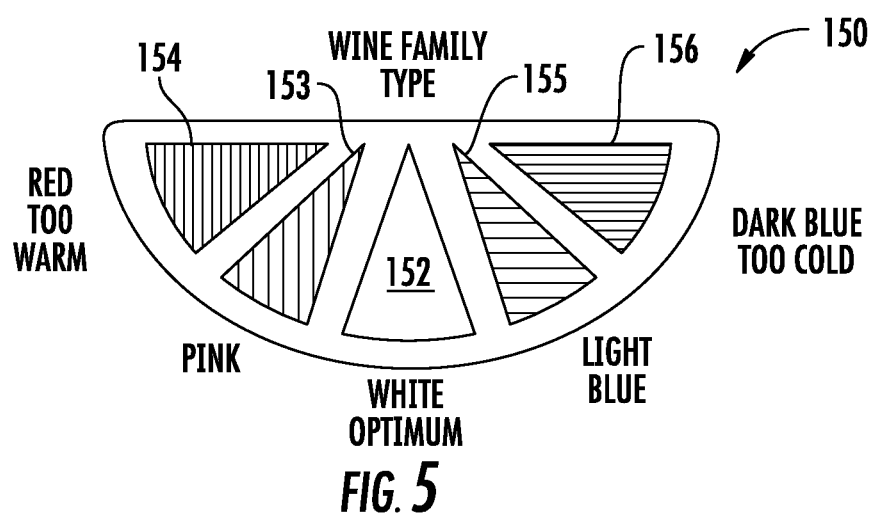
FIG. 5 is a front view of the temperature fan shown beneath the wine label of FIG. 4.

For a first embodiment of the present invention, per FIGS. 4 and 5, components that have equivalents with the prior art universal thermometer of FIGS. 1 through 3 are commonly numbered though in the next hundred series and without a P (for "prior art") suffix.

In FIGS. 4 and 5, there is a typical, standard-shaped wine bottle 110 that has a base 112, label panel region 114, neck 116 and mouth or top end 118. A product label 120 for the wine contents is affixed to the lower center of that bottle 110, between its base 112 and neck 116, over label panel region 114. Label 120 affixes to the label panel region 114 with one or more sections of adhesive (not shown).

Below the lower edge of product label 120, there is shown an inverted fan shape of specific wine product thermometer 150. Unlike the universal strip thermometer 24P if the prior art, this bottle temperature indicator is not complicated with one or more actual temperature scales. Nor does it include a bevy of color-coded ranges for every conceivable type of wine product from sparkling whites to complex reds and several stopping points in between. Instead, this fan shaped thermometer 150 is made specific for just one family/type of wine—which may or may not be listed on the thermometer label itself. No such product nomenclature appears in the views as shown.

But each Product-specific thermometer according to this invention will have between 3 and five temperature range indicators (per label). There will be a centermost preferred serving temperature (or a "white" sweet spot) 152, followed by a temperature indicator 154 for when the bottle contents are too warm (indicated in the accompanying FIGS. with a red "pie slice") and another indicator 156, at the opposite end for when the temperature contents are colder than ideal. For something too cold, this thermometer would indicate same with a blue-colored, pie slice. This gives the temperature indicator of the first preferred embodiment more of a patriotic flare, ranging from red-to-white-to-blue.

In the first preferred embodiment, FIGS. 4 and 5, there is also provided with some minor 'stopping points' in between too hot, too cold and "just right". Particularly, this embodiment further indicates, to the wine server/consumer when their bottle temperature is nearing its ideal, or white pie slice region 152. In the FIGS., this is shown with a pink pie slice 153 when just a little too warm (but otherwise "acceptable") and a lighter blue slice 155 which just a tad bit chillier than most preferred.

Note that, as shown, thermometer 150 is situated directly below the main product label 120 on bottle 110. It can be permanently affixed to the bottle as a separately sold item/accessory for that PARTICULAR type of wine product. Or, it can be customized for incorporating directly into an existing wine bottle label by the bottler itself. If desired, the same thermometer can be affixed using a less-than-permanent adhesive for peeling off and reusing following the purchase of another bottle the same wine product.

Also note that this bottle thermometer should reside on the label panel region 114 nearer the bottle base 112. It is NOT desired to include a bottle temperature indicator too high up on the bottle, such as on or too near too the bottle's neck 116 as there may be instances, however rare, that the bottle is not completely emptied and is re-corked or otherwise sealed for finishing at a later time. And to better indicate the temperature of the "remaining" bottle contents, this thermometer should rest on that portion of the bottle where wine product still resides (rather than on an empty region of a half-emptied bottle of wine).

Figure 6:
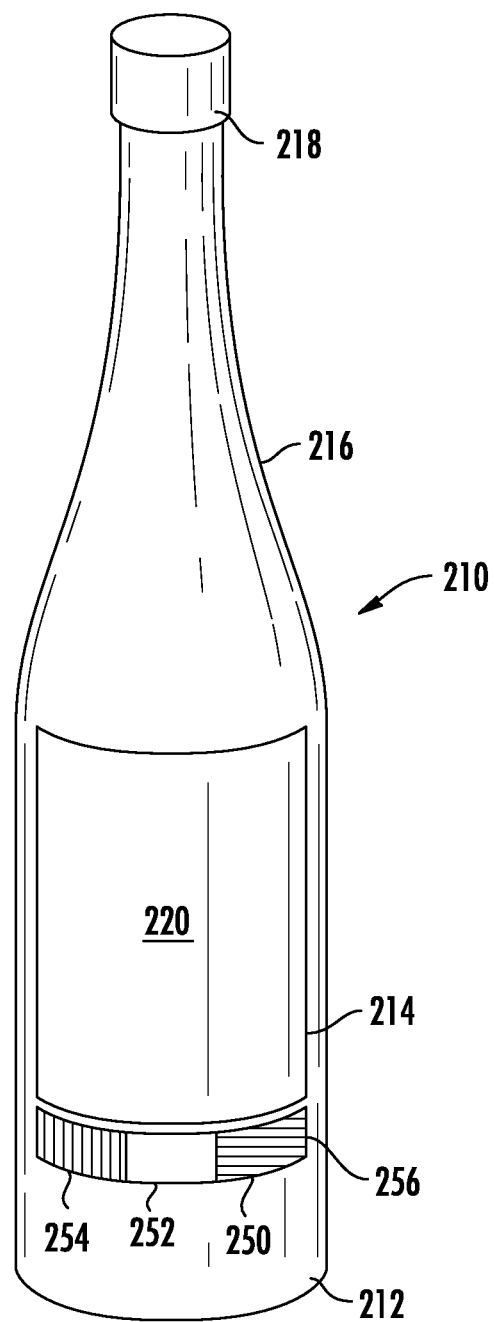
FIG. 6 is a perspective view of a banded wine bottle temperature indicator according to a first alternate embodiment of this invention.

In accompanying FIG. 6, a first alternative to the thermometer of FIGS. 4 and 5 is shown at the base of its bottle 210. Particularly therein, that temperature-indicating device 250 is situated as a vertically extending, adhesive strip directly below the product label 220 on that bottle of wine. Unlike the first variation, this alternate includes only three temperature indicator colors, a white (or "preferred serving temperature" section 252, specific for the type of wine product contained therein), bookended on either side with a red section or segment 254, when warmer than ideal and a blue section 256 for when just too cold.

Figure 7:
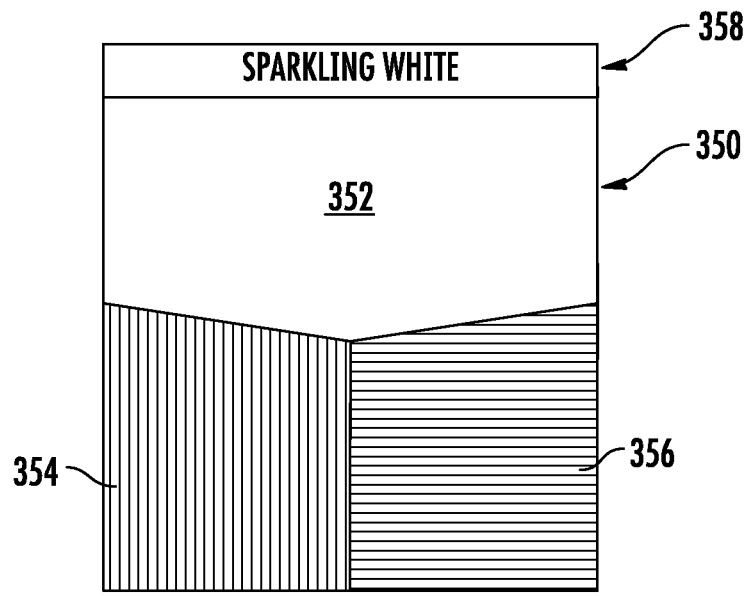
FIG. 7 is a front view of a squared wine bottle temperature indicator per a second alternate embodiment.

The alternate temperature indicator 350 shown at FIG. 7 is meant to be more box-like than fan-shaped or that of a temperature strip per se. It can be further morphed into a shield-shape if desired (but not shown). This type of variant would be far more conducive to repeated reuse. As such, it would preferably include a generic descriptor 358 somewhere on the thermometer proper. Particularly as shown, the representative descriptor "Sparkling White" is included on the banner above an upper most white, preferred serving temperature indicator 352, with a warmer red band 354 to the lower left of same and the cooler blue indicator section 356 directly to the right of red section 354.

Figure 8:
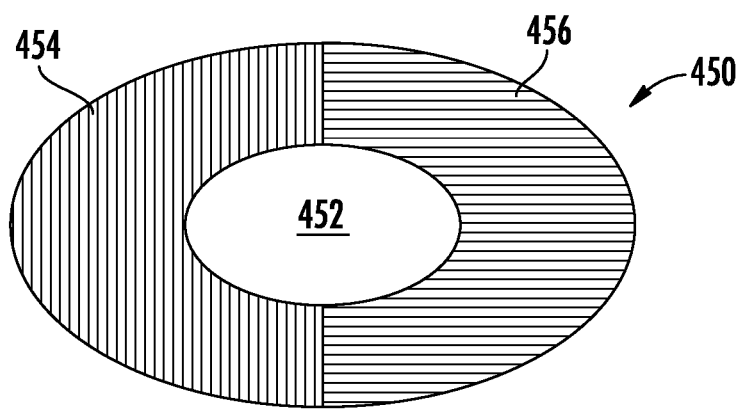
FIG. 8 is a front view of an oval-shaped wine bottle temperature indicator per a third alternate embodiment.

In FIG. 8, the prior square or rectangular shape of FIG. 7 is replaced by an oval "crestlike" temperature indicator 450, though a circle or polygon may be used as well. In this latest variation, the centermost button 452 indicates when an ideal serving temperature has been reached for the specific wine product type contained in a bottle to which indicator 450 has been at least temporarily affixed. A left outer semi-circle in red region 454 shows the server that the bottle's contents are warmer than preferred while the blue semi-circle 456 shows that the wine inside is cooler than ideal.

Figure 9:
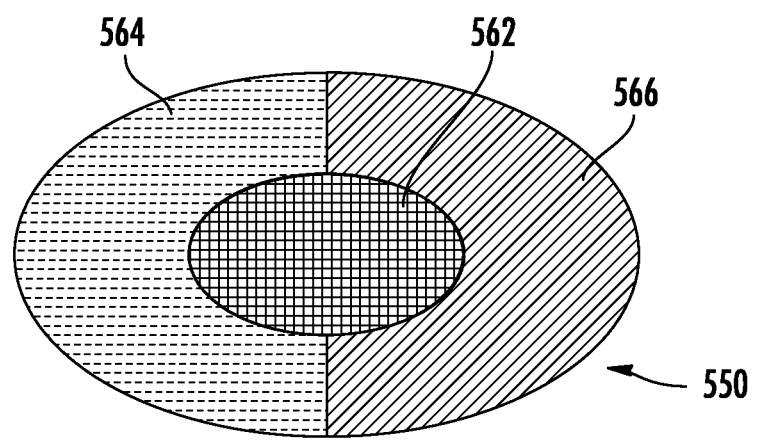
FIG. 9 is an alternate color scheme for the third embodiment of FIG. 8 using a gold-silver and bronze motif.

The aforementioned tri-color scheme is meant to exploit the red and blue dichotomy associated with most sink and tub faucets (where red is for "hot" and blue for "cold"). FIG. 9 is the next variation to exploit a totally different, tri-color scheme based on the awarding of Olympic medals. For the most preferred serving temperature of that indicator 550, center button 562 is gold in color. For slightly warmer contents, the silver semi-circle to the left of center, section 564 will be made visible and for slightly colder contents, a bronze "reverse C", section 566 will appear until a warm enough serving temperature has superseded it.

Having described the several presently preferred embodiments above, it is to be understood that this invention may be otherwise described within the scope of the individual product claims immediately following.

What is claimed is:

1. A bottle thermometer customized for a particular type of wine product in a bottle, said thermometer comprising:
   an adhesive-backed flexible substrate; and
   a liquid crystal temperature panel having three to five predetermined color sections mounted on the flexible substrate for at least temporarily adhering to a lower body portion of the bottle with a first color section of the panel indicating when a preferred serving temperature for the particular type of wine product inside the bottle has been reached, a second color section of the panel indicating when the temperature for the particular type of wine product inside the bottle is higher than preferred and a third color section of the panel indicating when the temperature for the particular type of wine product inside the bottle is lower than preferred, said panel displaying only one of the color sections at a time for indicating the temperature of the particular type of wine product inside the bottle.

2. The bottle thermometer of claim 1 wherein the color sections include a white first section, a red second section and a blue third section.

3. The bottle thermometer of claim 2, which further includes a pink color section between the first and second color sections for indicating when the serving temperature for the particular type of wine product is nearing that of the first color section.

4. The bottle thermometer of claim 2, which further includes a light blue color section between the first and third color sections for indicating when the serving temperature for the particular type of wine product is nearing that of the first color section.

5. The bottle thermometer of claim 1, which is substantially fan-shaped and includes a pie-shape for each color section.

6. The bottle thermometer of claim 5, which is intended to extend directly below a product label for the bottle.

7. The bottle thermometer of claim 6, which is incorporated into the product label for the bottle.

8. The bottle thermometer of claim 1, which is substantially rectangular with a larger region for the first color section situated over smaller regions for the second and third color sections.

9. The bottle thermometer of claim 8, which further includes a panel describing the particular type of wine product inside the bottle.

10. The bottle thermometer of claim 1, which is substantially oval with a large center button region for the first color section and semi-circularly shaped regions for the second and third color sections on either side of the first color region.

11. The bottle thermometer of claim 1, which includes an adhesive backing layer that permits removal from a first bottle and reattachment to a second bottle of the same particular type of wine product.

12. The bottle thermometer of claim 1 wherein the color sections include a gold first section, a silver second section and a bronze third section.

13. A bottle thermometer customized for a particular type of wine product in a bottle, said customized thermometer comprising:
   an adhesive-backed flexible substrate; and
   a liquid crystal temperature panel having three predetermined color sections mounted on the flexible substrate with only one of the color sections being visible at a time, said visible color section indicating the temperature of the particular type of wine product inside the bottle, a first color section indicating when a preferred serving temperature for the particular type of wine product inside the bottle has been reached, a second color section indicating when the temperature for the particular type of wine product inside the bottle is warmer than preferred and a third color section indicating when the temperature for the particular wine product inside the bottle is cooler than preferred.

14. The customized bottle thermometer of claim 13 wherein the color sections include a white first section, a red second section indicating warmer than preferred and a blue third section indicating cooler than preferred.

15. The customized bottle thermometer of claim 13 wherein the color sections include a gold first section, a bronze second section indicating warmer than preferred and a silver third section indicating cooler than preferred.

16. The customized bottle thermometer of claim 13, which is substantially fan-shaped and includes a pie-shape for each color section.

17. The customized bottle thermometer of claim 13, which further includes a panel describing the particular type of wine product inside the bottle.

18. The customized bottle thermometer of claim 13, which is substantially oval with a large center button region for the first color section and semi-circularly shaped regions for the second and third color sections on either side of the first color region.

19. The customized bottle thermometer of claim 13, which includes an adhesive backing layer that permits removal from a first bottle and reattachment to a second bottle of the same particular type of wine product.

20. A thermometer for indicating a temperature of a particular type of wine product in a bottle to which the thermometer has been adhered, said thermometer comprising:
- an adhesive-backed flexible substrate; and
- a liquid crystal temperature panel having three predetermined color sections mounted on the flexible substrate with a white color section indicating when a preferred serving temperature for the particular type of wine product inside has been reached, a red color section indicating when the temperature for the particular type of wine product inside is higher than preferred and a blue color section indicating when the temperature for the particular type of wine product inside is lower than preferred, said panel displaying only one of the three color sections, the white color section, the red color section or the blue color section at any one time.

\* \* \* \* \*